United States Patent [19]

Ficca

[11] 4,414,231
[45] Nov. 8, 1983

[54] SPECIAL NATURAL WINES SIMULATIVE OF LIQUEURS

[75] Inventor: Vincent G. Ficca, Princeton Junction, N.J.

[73] Assignee: Joseph E. Seagram & Sons, Inc., New York, N.Y.

[21] Appl. No.: 255,868

[22] Filed: Apr. 20, 1981

[51] Int. Cl.³ .......................... C12H 1/04; C12G 1/00
[52] U.S. Cl. .................................. 426/271; 426/592; 426/422; 426/330.4
[58] Field of Search ............... 426/592, 250, 262, 271, 426/422, 442

[56] References Cited

U.S. PATENT DOCUMENTS 3,843,809 10/1974 Luck .................................. 426/592
4,156,026 5/1979 Gogel ................................ 426/592

FOREIGN PATENT DOCUMENTS 2644683 4/1978 Fed. Rep. of Germany ...... 426/592

OTHER PUBLICATIONS

Grossman, Harold J., *Grossman's Guide to Wines, Beers and Spirits*, Charles Scribner's Sons, N.Y., 1977, pp. 282 and 283.
Amerine, M. A. et al., *The Technology of Wine Making*, 3rd Ed., AVI Publishing Co., Inc., Westport, Conn.; 1972, pp. 503, 504, 520 and 733-737.

Primary Examiner—Raymond N. Jones
Assistant Examiner—Elizabeth J. Curtin
Attorney, Agent, or Firm—Kane, Dalsimer, Kane, Sullivan & Kurucz

[57] ABSTRACT

Special natural wines are prepared by sweetening and flavoring of selected natural wines having particular acidity, sugar and alcohol content. The special natural wines so prepared simulate distilled liqueurs in taste.

5 Claims, 4 Drawing Figures

SPECIAL NATURAL WINES SIMULATIVE OF LIQUEURS

BACKGROUND OF THE INVENTION

1. Field of the Invention

The invention relates to alcoholic beverages and more particularly relates to a simulated cordial or liqueur and the method of its preparation from a natural wine.

2. Brief Description of the Prior Art

Liqueurs or cordial beverages are known from biblical times. Generally they have been prepared by the distillation of natural wines and brandies. They are relatively expensive in view of the distillation process employed for their genesis.

By the method of the present invention, we are able to produce special natural wines simulating the taste, aroma and appeal of liqueurs produced by the distillation processes. The method of the invention does not require a distillation step and is relatively more economical. The special natural wines of the invention are stable over long periods of time, even when stored at room temperatures.

SUMMARY OF THE INVENTION

The invention comprises a special natural wine, simulative of a distilled liqueur, which comprises:

a natural wine comprising from 20 to 24 percent (by volume) of alcohol;

a sweetening proportion of a sweetener selected from the group consisting of corn syrup, corn syrup derivative sweeteners, invert sugar syrup and a liquid sugar of not less than 60 brix (by weight); and a flavoring proportion of a natural flavoring;

said natural wine being taste compatible with the flavoring;

said special natural wine being characterized in part by an alcohol content of from 15 to 21 percent (by volume), a solids content of from about 20 to 45 brix, by weight (dealcoholized), a total acid content of 0.05 to 1.0 gms/100 ml (as tartaric acid) and a pH of 3.5 to 5.5.

The invention also comprises a method of preparing the special natural wines of the invention from natural wines such as natural grape wines.

The term "special natural wine" as used throughout the specification and claims means a flavored wine made from a base of natural wine. The flavoring added is in such quantities or proportions that the product wine derives a distinctive flavor distinguishable from the base wine.

The term "natural wine" is employed herein in its conventionally accepted sense as meaning the product of the juice or must of sound, ripe fruit, made with such cellar treatment as may be customary in the wine making art, for example as authorized under the statutory authority of U.S. federal laws; see 26 U.S.C. 5381 and 27 CFR 240.360. Preferred in the method and wines of the invention are natural grape wines.

The term "a natural flavoring" as used herein means naturally occurring herbs, spices, fruits, aromatics, essences and their extracts, concentrates, derivatives and the like conventionally used in the food and beverage industry as flavoring.

The special natural wines of the invention are useful to promote digestion, sociability, conversation and warm feelings.

Figure 1:
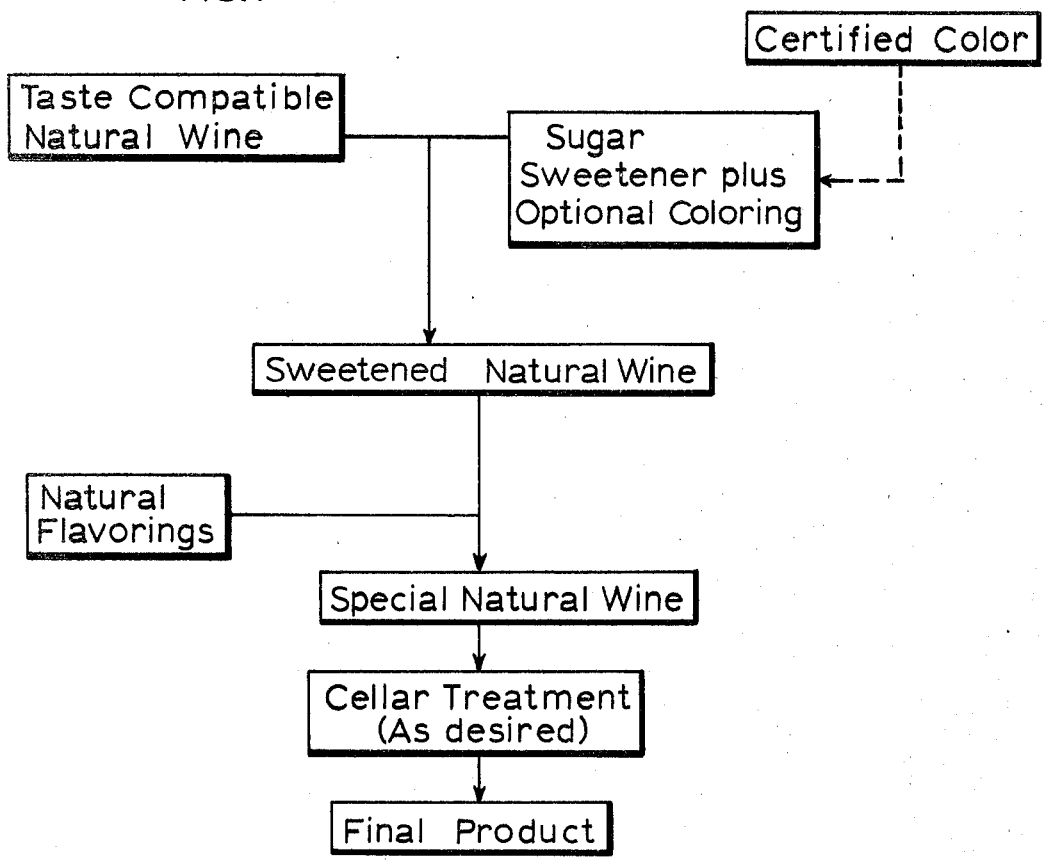
FIG. 1 is a block diagram of a preferred embodiment method of the invention for the production of the special natural wines of the invention.

In the drawings, broken lines indicate optional process steps.

DETAILED DESCRIPTION OF THE PREFERRED EMBODIMENTS OF THE INVENTION

Those skilled in the art will have an appreciation of the invention from the following description of the preferred embodiments of the invention, when read in conjunction with a viewing of the accompanying drawings of FIGS. 1-4, inclusive.

In broadest terms, the method of the invention may be carried out by a homogeneous blending of a natural wine of a particular character, a sweetener and natural flavoring. The blending is carried out by simple admixture of the selected ingredients, employing conventional mixing apparatus and techniques.

Referring first to FIG. 1, there is seen a block diagram of a preferred embodiment method of the invention. In the first step diagrammed, one provides a quantity of natural wine which is taste compatible with the flavorings to be used subsequently. This requirement for "taste compatibility" will be described more fully hereinafter.

There is also initially provided a quantity of a sweetener selected from the group consisting of corn syrup, corn syrup derivative sweeteners, invert sugar syrup, dry sugar and liquid sugar of not less than 60 brix, by weight. The term "dry sugar" as used herein means a solid form of sugar (which may contain moisture) such as granulated sugar of a type and grade acceptable for human consumption. When coloring of the final product is desirable a coloring proportion of a certified food coloring may be combined with the sweetener. This optional step is shown in FIG. 1 also.

The taste compatible natural wine is homogeneously mixed with the sweetener (and optional certified color) in the next step. If the sweetener employed is a dry sugar, it is advantageous to carry out the mixing with a high speed agitator to affect complete dissolution of the sugar. The resulting sweetened wine mixture is then flavored by the addition, with mixing, of desired flavoring materials. After a homogeneous flavored mixture is obtained, the product special natural wine may be further processed with conventional cellar treatments to obtain a finished, commercially acceptable product. Cellar treatments comprise filtering, clarifying, purifying and like procedures to stabilize the special natural wine; see for example the United States Regulations 27 CRF 240. The product may then be bottled.

Preferably, all of the mixing steps comprising the method of the invention are carried out under an inert gas atmosphere, such as nitrogen gas, to minimize oxidation of the natural wine ingredient. However this is not critical to the method of the invention.

The method of the invention as described above may be carried out over a wide range of temperature conditions. Advantageously, the method is carried out below the boiling point of the alcohol ingredients, preferably within the range of from about 30° F. to about 75° F. at atmospheric pressures.

The natural wine ingredients of the special natural wines of the invention must be compatible with the flavoring ingredients, i.e.; "taste compatible." It will be appreciated that taste is a subjective sense and what may be pleasing to a given individual may be unpleasant to another. However, to the liqueur drinker there are taste sensitivities which must be honored. It is within the skill of the art to meet those sensitivities by a blending of the tastes and flavors inherent to the selected sweetened natural wine with the flavoring ingredients to be added in the method of the invention.

In general, there are three basic natural grape wines which may be used in the present invention. One may be used without treatment or adjustment of its physical properties to render it compatible with certain flavoring ingredients. This is a red port dessert wine. Red port dessert wines are usefully employed where their reddish color is not objectionable to the color of the desired product special natural wine, such as for example in a blackberry flavored, simulated cordial. The taste characteristics of the red port dessert wine is compatible with the flavorings used in preparing such a product and in fact the fruity notes of the natural wine complement any added flavorings, to produce the desired characteristic taste and aroma of a liqueur. Red port dessert wines may also be employed as a portion of the base or natural wine ingredient in other berry flavored special natural wines of the invention such as a sloeberry flavored product. The red port dessert wines so employed will generally have an alcohol content of from 15 to 24 percent (by volume), a sugar content of not less than 6 brix by weight (dealcoholized), a total acid content of 0.25 to 0.8 mgs/100 ml (as tartaric acid) and a pH of from 3.2 to 4.5. Distilled wine spirits may be added as desired or necessary to adjust the alcohol content to within the range of 20 to 24 percent (by volume) as shown in the FIG. 2.

Figure 2:
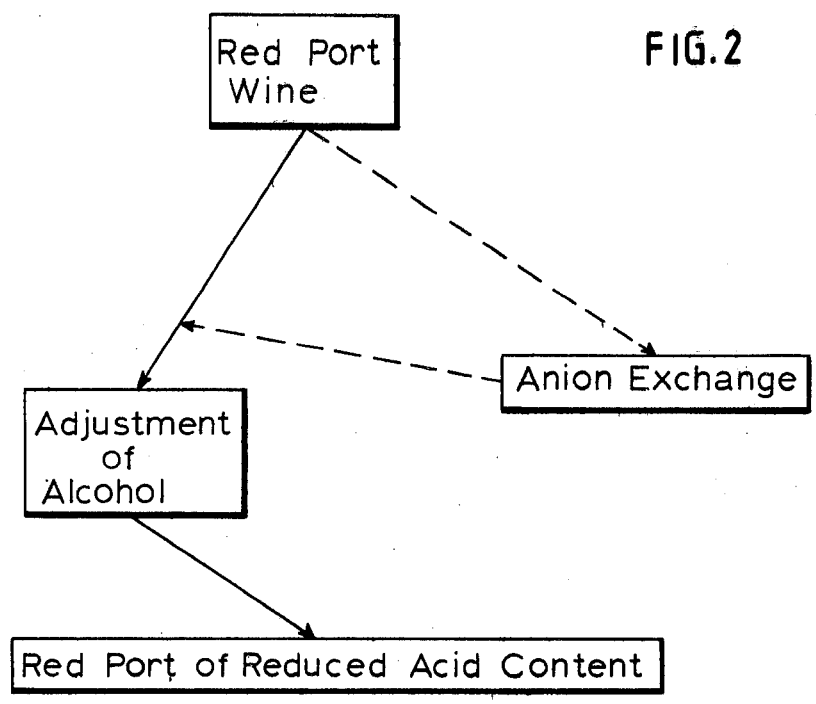
FIG. 2 is a block diagram showing an embodiment process for rendering red port wines compatible for use in the invention.

FIG. 2 is a block diagram showing an embodiment process of the invention for making red port dessert wines compatible for use in the method of the invention. In this embodiment process, the red port dessert wine may also be treated to reduce acid content, when necessary or desired, as by anion-exchange.

The other two natural grape wines advantageously employed in the present invention are a white wine and a sherry wine. However, these wines generally require some treatment to improve their compatibility with the flavoring ingredients to be added.

Natural grape white wines are generally found to be characterized by a relatively low pH (2.5–4.0) and relatively high acid contents, with alcohol contents of from 15 to 24 percent (by volume) and solids (sugar) contents of about 0.5 to 16.9 brix, by weight, (dealcoholized). To modify the natural white wines for use in the present invention it is necessary to reduce the total acid content to levels of circa 0.25 to 0.35 g/100 ml (as tartaric acid) with a consequent raising of the pH to a desired range of 3.8–4.5). The reduction of overall acidity also promotes compatibility of the final product with milk and milk based mixers. This is a desired attribute of liqueurs or cordials. The reduction of tartaric acid, when necessary, may be carried out employing conventional methods and apparatus. Conveniently the reduction is carried out by passing the wine through a weak anion-exchange resin. The technique is well known and need not be described in detail herein; see for example the description given in U.S. Pat. Nos. 4,156,026 and 4,205,092. The anion-exchange treatment also, of course, lowers the overall acidity of the wine, preferably to not less than 2.5 parts per thousand of wine. The anion-exchange resin treatment is said to also stabilize the wine, particularly in regard to its tartrate content, and to improve palatability of the wine. There is a definite enhancement of flavor characteristics associated with the taste of distilled spirit liqueurs. Other methods of reducing tartaric levels in wine are described in U.S. Pat. Nos. 2,117,604 and 4,015,020.

Figure 3:
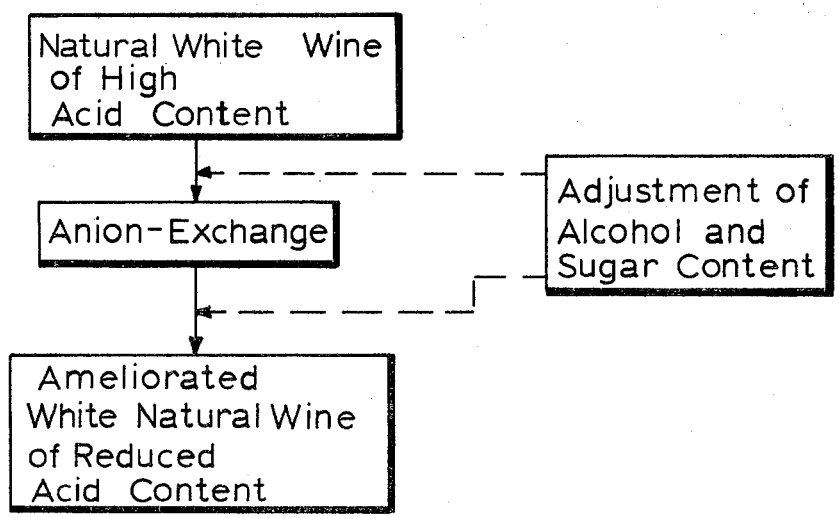
FIG. 3 is a block diagram showing an embodiment process for rendering natural white wines compatible for use in the invention.

Following the treatment of the natural white wines to make them compatible for use in the invention, they may generally be characterized as having an alcohol content of from 15 to 24 percent (by volume) a pH of 3.8 to 4.5 and a total acid content of not less than 2.5 parts per thousand. Advantageously the white wine is adjusted to an alcohol content of 20 to 24 percent (by volume) by the addition of distilled wine spirits and ameliorated by the addition of sugar to have a solids content of from 15 to 17 brix, by weight (dealcoholized). The adjustments of sugar and alcohol content may be made, alternatively, prior to an anion-exchange treatment. FIG. 3 is a block diagram showing, in summary, the process of rendering white wines compatible for use in the invention.

The natural white grape wine treated as described above is compatible with subsequent flavoring materials associated, for example with peppermint flavors. The treated white wine may also be combined with red port dessert wines as described above or with sherry wines as described hereinafter for use in the method of the invention.

Cream sherry natural wines are, in broad terms, cooked white wines. They may be characterized in part by alcohol contents of circa 17–19 percent (by volume) and solids contents (sugar) of about 8–12 brix, by weight (dealcoholized). They may have a heavy, nut-like flavor which, with treatment, is advantageous in the method of the present invention. Like the white wine, cream sherry also has a relatively low pH (2.5 to 4.0) which is indicative of its acidity. This acidity requires the same adjustment as described in relation to the white natural wines and may be adjusted in the same manner, i.e.; preferably by anion-exchange as previously described. Preferably the sugar content is adjusted to a level of 8–16 preferably 12 brix, by weight, (dealcoholized). Advantageously the alcohol content of the cream sherry wine base is also adjusted by the addition of distilled wine spirits, either before or after anion-exchange treatment, to a level of 20 to 24 percent (by volume).

As observed previously, cream sherry natural wines may have a characteristic heavy nut-like flavor. Desirably, the cream sherry wine is treated prior to anion-exchange treatment, to reduce but not eliminate this flavor so the natural wine will be more compatible with the flavoring ingredients to be subsequently added. This may be accomplished by contacting the wine with lactic acid precipitated casein. The contact reduces the nut-like flavor, clarifies the wine and enhances the wine color.

Figure 4:
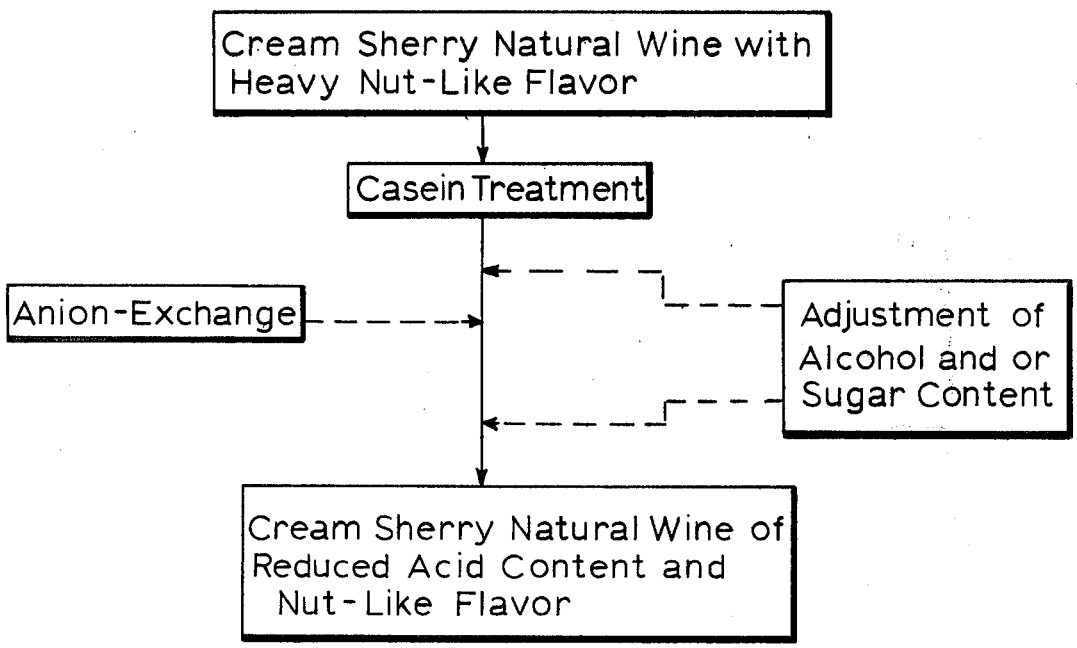
FIG. 4 is a block diagram showing an embodiment process for rendering natural cream sherry wines compatible for use in the method of the invention.

A summary of the preferred process for treating natural cream sherry grape wines to make them compatible for use in the method of the invention is shown in the FIG. 4, a block diagram of the process as described above.

The casein, anion-exchange treated, natural cream sherry wine has a reduced but distinct nut-like flavor which enhances, complements and is compatible with nutty and nut-like flavorings employed in the present invention to produce the simulated liqueurs of the invention. Thus, it is advantageous to use the treated cream sherry wine when the final product is desired to possess flavors of almond, coffee, cocoa and the like. The cream sherry base is also compatible for use with orange, apricot and like natural flavoring materials.

The flavoring compatible cream sherry wines may also be combined with natural white wines which are flavor compatible to create particular taste effects, reduce sweetness etc.

Any of the known natural flavorings may be employed in the method and the compositions of the invention, in proportions which will deliver the desired flavor impact. Representative of flavorings which may be employed are natural peppermint extracts, fruit concentrates and extracts, vanilla extracts, almond extracts, anise extracts, essences of herbs and spices, coffee extracts and the like. Generally the proportions of such flavorings used are such as to supply not more than 10% by volume of the compositions of the invention. When the flavorings are alcoholic materials, they should not be used in proportions which will provide more than 4 percent (by volume) of the alcohol content in the special natural wines of the invention.

The proportions of the natural wines and sweeteners employed in admixture with the natural flavorings will vary to some degree depending on the sweetness and flavor desires and the particular natural wine ingredient. Account must also be taken of the quantity of and type of flavoring employed. In general however the proportions employed are such that the special natural wines of the invention have solids content of 20 to 45 brix, by weight (dealcoholized). Preferably, when the base natural wine is a red port grape wine, the solids content of the special natural wines of the invention are within the range of 20 to 35 brix by weight (dealcoholized) and when a cream sherry is used, a solids content of 23 to 38. In certain instances a higher degree of sweetness may be desired, such as in coffee and cocoa flavored beverages of the invention. In the latter case, a solids content of 35 to 45 brix, by weight (dealcoholized) is preferred.

The following preparations and examples describe the manner and the process of making and using the invention and set forth the best mode contemplated by the inventor of carrying out the invention but are not to be considered as limiting.

PREPARATION 1

A cream sherry natural wine having a heavy nut-like flavor is treated with lactic acid precipitated casein using the following procedure.

An appropriate vessel is charged with 35 gallons of water and sufficient ammonium hydroxide to obtain a pH of from 10–12. To the charge there is added with stirring 30 lbs. of lactic acid precipitated casein. With continued stirring, the resulting mixture is heated to drive off ammonia gas. When the ammonia has been driven off (pH circa 7.5–8.5) the casein solution is added slowly to the 10,000 gallons of cream sherry with thorough mixing. The resulting mixture is then allowed to settle and the mixture filtered to obtain a casein treated, cream sherry natural wine.

EXAMPLE 1

A natural grape white wine meeting the high acid test for amelioration, is used in the blending process. A natural grape juice with a total acid of 0.63 grams per 100 ml. (as tartaric acid) is fermented into a dry white wine using acceptable cellar treatment procedures. The white wine is then fortified to 21% alcohol by volume for aging.

The aged white wine having an alcohol content of 21% by volume, total acid content of 0.47 grams/100 ml. (as tartaric acid) and a pH of 3.64 is passed through an anion-exchange column packed with Duolite A-7D resin (a granular, low porosity, weak base anion-exchange resin of cross-linked phenolformaldehyde having secondary amine groups as the principle functional group: Diamond Shamrock Co.). The resulting anion-exchanged wine has a pH of 4.24 and a total acid content of 0.27 grams/100 ml. (as tartaric acid). The ion exchanged white wine is sweetened with dry sugar and fortified with grape high proof. The resulting sweetened and fortified wine has a total solids content of 16.6 percent (dealcoholized brix), an alcohol content of 23.9 percent by volume, a pH of 4.2 and a total acid content of 0.25 grams/100 ml. (as tartaric acid).

EXAMPLE 2

An appropriate mixing vessel is charged with 680 gallons of the anion-exchanged, sweetened and fortified wine prepared in Example 1, supra., and the equivalent of 279 gallons of invert sugar and/or granulated sugar, and/or liquid sugar and/or high fructose corn syrup of not less than 60 percent solids (by weight). To the mixture there is added 160 grams of F.D. & C. Blue #1, and 208 grams of F.D. & C. Yellow #5 certified colors. The resulting mixture is stirred under a blanket of nitrogen gas until a homogeneous mixture is obtained. To the resulting homogeneous mixture of wine, sugar, and certified colors, there is then added with continued stirring 41 gallons of natural peppermint extract (contains 90.5–93.5 percent alcohol by volume). Stirring is continued until a homogeneous mixture is obtained. The latter mixture is then filtered and bottled. The product is a green mint flavor cordial having an alcohol content of 20 percent by volume, a solids content of 35.4 brix, by weight (dealcoholized) a total acid content of 0.20 gm/100 ml. (as tartaric acid) and a pH of 4.0.

EXAMPLE 3

An appropriate mixing vessel is charged with 680 gallons of the natural grape white wine that was ion exchanged, sweetened and fortified in Example 1, supra., and the equivalent of 279 gallons of invert sugar and/or granulated sugar, and/or liquid sugar, and/or high fructose corn syrup of not less than 60 percent solids by weight.

The resulting mixture is stirred under a blanket of nitrogen gas until a homogeneous mixture is obtained. To the resulting homogeneous mixture of wine and sugar, there is added with continued stirring 41 gallons of natural peppermint extract (contains 90.5–93.5 percent alcohol by volume). Stirring is continued until a homogeneous mixture is obtained. The latter mixture is then filtered and bottled. The product is a white mint flavored cordial having an alcohol content of 20 percent by volume, a solids content of 36.7 brix, by weight (dealcoholized) a total acid content of 0.19 gm/100 ml (as tartaric acid) and a pH of 4.0.

EXAMPLE 4

An appropriate mixing vessel is charged with 685 gallons of natural grape white wine that was ion exchanged, sweetened, and fortified in Example 1, supra., and the equivalent of 248 gallons of inverted sugar and/or granulated sugar, and/or liquid sugar and/or high fructose corn syrup of not less than 60 percent solids by weight. The resulting mixture is stirred under a blanket of nitrogen gas until a homogeneous mixture is obtained. To the resulting homogeneous mixture of wine and sugar, there is added with continued stirring 67 gallons of natural peppermint extract (contains 54.3–56.1 percent alcohol by volume).

Stirring is continued until a homogeneous mixture is obtained. The latter mixture is then filtered and bottled. The product is peppermint flavored cordial having an alcohol content of 20 percent by volume, a solids content of 28.8 brix by weight, (dealcoholized) a total acid content of 0.18 gm/100 ml. (as tartaric acid) and a pH of 4.0.

EXAMPLE 5

A natural grape red wine having an alcohol content of 17.9 percent by volume a total acid content of 0.46 grams/100 ml. (as tartaric acid) and a pH of 3.86 is fortified with grape high proof. The resulting wine (sweetened and fortified) has a total solids content of 10.5 percent (dealcoholized brix) an alcohol content of 23.9 percent by volume, a pH of 3.9 and a total acid content of 0.41 grams/100 ml. (as tartaric acid).

EXAMPLE 6

An appropriate mixing vessel is charged with 410 gallons of the natural grape wine, red port, prepared in Example 5, supra., 410 gallons of natural grape white wine that was ion exchanged, sweetened, and fortified in Example 1, supra., and the equivalent of 1195 gallons of invert sugar and/or granulated sugar and/or liquid sugar and/or high fructose corn syrup of not less than 60 percent solids by weight plus the addition of 4.2 lbs of F.D. & C. #40 certified color. The resulting mixture is stirred under a blanket of nitrogen gas until a homogeneous mixture is obtained. To the resulting homogeneous mixture of wine, sugar, and certified color, there is added with continued stirring 28 gallons of reconstituted sloeberry concentrate, 10.0 gallons of sloe gin flavor (22.8 to 24.2 percent alcohol by volume), 10.0 gallons of natural sloeberry flavor (20.5 to 22.0 percent alcohol by volume), 2.0 gallons of cherry essence (circa 36.6 percent alcohol by volume), 5.0 gallons of natural grenadine type flavor (14–18 percent alcohol by volume), 5.0 gallons of natural sloe gin cordial flavor (25.0 to 26.3 percent alcohol by volume) and 5 gallons of natural almond extract (89.5 to 92.5 percent alcohol by volume) is added to the charge. The resulting mixture is filtered and bottled. The bottled wine is a sloeberry flavored natural grape wine cordial having an alcohol content of 20 percent (by volume), a solids content of 25.6 brix by weight (dealcoholized), a total content of 0.52 gms/100 ml (as tartaric acid) and a pH of 3.7.

EXAMPLE 7

An appropriate mixing vessel is charged with 808 gallons of red port natural grape wine, prepared in Example 5, supra., and the equivalent of 157 gallons of invert sugar and/or granulated sugar, and/or liquid sugar, and/or high fructose corn syrup of not less than 60 percent solids by weight. The resulting mixture is stirred under a blanket of nitrogen gas until a homogeneous mixture is obtained. To the resulting homogeneous mixture of wine and sugar, there is added with continued stirring 8.0 gallons of raspberry flavor (12 to 17 percent alcohol by volume), 12.0 gallons of blackberry flavor (20 to 22 percent alcohol by volume), and 15.0 gallons of blackberry flavor (16.2 to 18.2 percent alcohol by volume). After a homogeneous mixture is obtained, the mixture is filtered and bottled to obtain a blackberry flavored cordial having an alcohol content of 20 percent (by volume), a solids content of 29.5 brix (dealcoholized), a total acid content of 0.63 gm/100 ml (as tartaric acid) and a pH of 3.6.

EXAMPLE 8

A natural grape wine (cream sherry) having an alcohol content of 17.4 percent by volume, a total acid content of 0.52 grams/100 ml (as tartaric acid) and a pH of 3.95 is casein treated following the procedure of Preparation 1, supra. The wine is then passed through an ion exchange column packed with Duolite A-7D resin (a granular, low porosity, weak base anion-exchanged resin of cross linked phenolformaldehyde having secondary amine groups as the principle functional group: Diamond Shamrock Corp.). The resulting anion exchanged wine has a pH of 4.42 and a total acid content of 0.33 grams/100 ml. (as tartaric acid). The ion exchanged wine is then fortified with grape high proof. The resulting fortified wine has a total solids content of 11.9 percent (dealcoholized brix) and an alcohol content of 23.9 percent by volume, a pH of 4.5 and a total acid content of 0.29 grams/100 ml (as tartaric acid).

EXAMPLE 9

An appropriate mixing vessel is charged with 680 gallons of the natural cream sherry grape wine prepared in Example 8 supra., and the equivalent of 264 gallons of invert sugar and/or granulated sugar, and/or liquid sugar and/or high fructose corn syrup of not less than 60 percent solids by weight. The resulting mixture is stirred under a blanket of nitrogen gas until a homogeneous mixture is obtained. To the resulting homogeneous mixture of wine and sugar, there is added with continued stirring, 21.0 gallons of chocolate natural flavoring (45 to 50 percent alcohol, by volume), 8.0 gallons of vanilla extract (35.0 to 35.7 percent alcohol by volume), and 27.0 gallons of natural almond extract (89.5 to 92.5 percent alcohol, by volume). When a homogeneous mixture is obtained, it is filtered and bottled. The bottled product is an almond flavored cordial having an alcohol content of 20 percent (by volume), a solids content of 32.6 brix (dealcoholized), a total acid content of 0.25 gm/100 ml. (as tartaric acid) and a pH of 4.5.

EXAMPLE 10

A natural grape wine (cream sherry) having an alcohol content of 17.4 percent by volume, a total acid content of 0.52 grams/100 mls. (as tartaric acid) and a pH of 3.95 is casein treated following the procedure of Preparation 1, supra. The casein treated wine is then fortified with grape high proof. The resulting fortified wine has a total solids content of 12.10 percent (dealcoholized brix), an alcohol content of 23.9 percent (by volume) a pH of 4.0 and a total acid content of 0.29 grams/100 ml. (as tartaric acid).

EXAMPLE 11

An appropriate mixing vessel is charged with 788 gallons of natural grape wine (cream sherry prepared in Example 10, supra.) and the equivalent of 159 gallons of invert sugar and/or granulated sugar and/or liquid sugar and/or high fructose corn syrup of not less than 60 percent solids by weight. The resulting mixture is stirred under a blanket of nitrogen gas until a homogeneous mixture is obtained. To the resulting homogeneous mixture of wine and sugar there is added with continued stirring 21.0 gallons of apricot natural flavoring (14.7-15.3 percent alcohol by volume), 22.0 gallons of apricot flavor (31-33 percent alcohol by volume), 5.0 gallons of natural flavor blend (6.5 to 9.0 percent alcohol by volume) and 5.0 gallons of apricot flavor (circa 18.7 percent alcohol by volume), there is obtained an apricot flavored cordial having an alcohol content of 20 percent (by volume), a solids content of 28 brix (dealcoholized) a total acid content of 0.72 gm/100 ml (as tartaric acid) and a pH of 3.8.

EXAMPLE 12

An appropriate mixing vessel is charged with 690 gallons of natural grape wine (cream sherry prepared in Example 10, supra.) and the equivalent of 266.6 gallons of invert sugar and/or granulated sugar and/or liquid sugar and/or high fructose corn syrup of not less than 60 percent solids by weight. The resulting mixture is stirred under a blanket of nitrogen gas until a homogeneous mixture is obtained. To the resulting homogeneous mixture of wine and sugar there is added with continued stirring, 10.0 gallons of natural orange flavor (60-64 percent alcohol, by volume), 6.0 gallons of orange extract (79-81 percent alcohol), 6.0 gallons of curacao extract (79-81 percent alcohol, by volume), 1.4 gallons of lemon extract (92-95 percent alcohol, by volume), and 20.0 gallons of orange extract (92-94 percent alcohol, by volume). There is obtained an orange flavored cordial having an alcohol content of 20 percent by volume, a solids content of 28.5 brix (dealcoholized), a total acid content of 0.35 gm/100 ml (as tartaric acid) and a pH of 3.8.

EXAMPLE 13

To 100 parts by volume of the anion-exchanged white wine prepared as described in Example 1, supra., there is mixed an equal volume of the anion-exchanged cream sherry wine prepared as described in Example 8, supra., under a blanket of nitrogen gas. An appropriate vessel is charged with 702 gallons of the resulting wine mixture, the equivalent of 227 gallons of invert sugar and/or granulated sugar and/or liquid sugar and/or high fructose corn syrup of not less than 60 percent solids by weight and 108 lbs. of instant coffee. The resulting mixture is stirred under a blanket of nitrogen gas until a homogeneous mixture is obtained. To the resulting homogeneous mixture of wine and sugar there is added with continued stirring 50.0 gallons of coffee extract (45-50 percent alcohol by volume). After the extract is dissolved, 5.0 gallons of vanilla extract (35.0-35.7 percent alcohol by volume), 2.0 gallons of apricot flavor (31.33 percent alcohol by volume), 4.0 gallons of anise extract (93-95 percent alcohol by volume) and 2.0 gallons of orange extract (93-95 percent alcohol by volume) are added with continued stirring. After a homogeneous mixture is obtained, it is filtered and bottled. The bottled product is a coffee flavored cordial having an alcohol content of 20 percent by volume, a solids content of 42.4 brix (dealcoholized), a total acid content of 0.34 gm/100 ml (as tartaric acid) and a pH of 4.6.

EXAMPLE 14

To 435 gallons of the anion-exchanged cream sherry wine prepared as described in Example 8, supra., there is mixed 287 gallons of the anion-exchanged white wine prepared as described in Example 1, supra., under a blanket of nitrogen gas. To the mixture there is added with stirring the equivalent of 207 gallons of invert sugar and/or granulated sugar and/or liquid sugar and/or high fructose corn syrup of not less than 60 percent solids by weight. The resulting mixture is stirred under a blanket of nitrogen gas until a homogeneous mixture is obtained. To the resulting homogeneous mixture of wine and sugar, there is added with continued stirring 45.5 gallons of chocolate natural flavoring (42.5 percent alcohol by volume), 5 gallons of vanilla extract (supra.), 10.0 gallons of St. John's Bread PD-75436 (circa 20.2 percent alcohol, by volume; Naarden International, supra.), 10.25 gallons of cocoa (supra.) and 0.18 gallons of natural almond extract (supra.). After a homogeneous mixture is obtained it is filtered and bottled. The bottled product is a cocoa flavored cordial with an alcohol content of 20 percent (by volume), a solids content of 39.7 brix (dealcoholized), a total acid content of 0.30 gm/100 ml (as tartaric acid) and a pH of 4.4.

The special natural wines prepared according to the Examples 1-14, supra., when submitted to panels of qualified tasters, are found and judged to be simulative of flavor corresponding distilled spirit liqueurs in taste and aroma.

It will be appreciated that the special natural wines of the invention are characterized in part by an unusually high pH, i.e.; to 4.5. Those skilled in the art might expect a wine product of such a high pH to be susceptible to oxidation and therefore of relatively short shelf life and low stability. Flavor substances are also notoriously unstable at high pH levels, breaking down in the presence of certain enzymes. Unexpectedly, this does not occur in the special natural wines of the invention. It may be that their relatively high sugar and alcohol contents inhibit certain bacteriological activity and actually stabilize the wine.

The term "alcohol" has been applied frequently herein. It will be appreciated that as used it is, for practical purposes, descriptive of ethyl alcohol.

In the drawings of FIGS. 1-4, broken lines are used to show optional steps in the preferred process.

What is claimed is:

1. A special natural wine, simulative of a distilled liqueur, which comprises;
   (A) a natural wine comprising an anion-exchanged sherry wine of reduced nut-like flavor, having a total acid content of from 0.25 to 0.35 gm/100 ml. as tartaric acid, a pH of 3.8 to 4.5 and from 20 to 24 percent by volume of alcohol; wherein said flavor reduction is accomplished by treating the sherry wine with lactic acid precipitated casein;
   (B) a sweetener selected from the group consisting of corn syrup, corn syrup derivative sweeteners, invert sugar syrup and a liquid sugar of not less than 60 brix by weight in an amount sufficient to result in sweetening of the natural wine; and (C) a natural flavoring in an amount sufficient to result in a flavoring of the natural wine; said special natural wine having an alcohol content of from 15 to 21 percent by volume, a solids content of from about 20 to 45 brix by weight dealcoholized, a total acid content of 0.05 to 1.0 gms/100 ml. as tartaric acid and a pH of 3.5 to 5.5.

2. An ameliorated sherry natural grape wine useful as an intermediate in the preparation of special natural wines, said intermediate having an alcohol content of from 20 to 24 percent by volume, a solids content of 8–16 brix, by weight dealcoholized, a total acid content of 0.25 to 0.35 gm/100 ml. as tartaric acid and a pH 3.8 to 4.5; said intermediate having been treated with lactic acid precipitated casein to reduce the nut-like flavor.

3. A method of reducing the nut-like flavor of a cream sherry natural grape wine, which comprises; contacting the wine with a lactic acid precipitated casein.

4. A method of preparing a special natural wine which is simulative of a distilled spirit liqueur, which comprises;
providing a natural sherry grape wine having a heavy nut-like flavor;
lowering the total acid content of the sherry wine to a range of from about 0.25 to about 0.35 gm/100 ml. as tartaric acid, whereby the pH is raised to from 3.8 to 4.5;
reducing the nut-like flavor by treatment with lactic acid precipitated casein;
sweetening the sherry wine by adding a sugar selected from the group consisting of corn syrup, corn syrup derivative sweeteners, dry sugar, an invert sugar syrup and a liquid sugar of not less than 60 brix, by weight, in a proportion sufficient to adjust the sugar content of the product special natural wine to within the range of from about 8 to 16 brix, by weight;
adding alcohol to the sherry wine as necessary to give the product special natural wine an alcohol content of from 20 to 24 percent by volume; and
flavoring the reduced in flavor, reduced in total acid, sweetened and added to cream sherry grape wine.

5. The method of claim 4 wherein lowering of the total acid is carried out by anion-exchange.

* * * * *